(12) United States Patent
Nauen (10) Patent No.: US 11,543,493 B2
(45) Date of Patent: Jan. 3, 2023

(54) DISTANCE MEASURING UNIT

(71) Applicant: OSRAM GmbH, Munich (DE)

(72) Inventor: Andre Nauen, Regensburg (DE)

(73) Assignee: OSRAM BETEILIGUNGSVERWALTUNG GMBH, Gruenwald (DE)

(*) Notice: Subject to any disclaimer, the term of this patent is extended or adjusted under 35 U.S.C. 154(b) by 922 days.

(21) Appl. No.: 16/395,264

(22) Filed: Apr. 26, 2019

(65) Prior Publication Data

US 2019/0353757 A1   Nov. 21, 2019

(30) Foreign Application Priority Data

May 17, 2018 (DE) .................... 10 2018 207 711.8

(51) Int. Cl.

| G01S 7/481 | (2006.01) |
| G01S 17/10 | (2020.01) |
| G01S 7/48 | (2006.01) |
| G01S 17/931 | (2020.01) |

(52) U.S. Cl.
CPC .......... *G01S 7/4817* (2013.01); *G01S 7/4808* (2013.01); *G01S 17/10* (2013.01); *G01S 17/931* (2020.01)

(58) Field of Classification Search
CPC ...... G01S 7/4817; G01S 7/4808; G01S 17/10; G01S 17/931; G01S 7/4814; G01S 7/4816; G01S 17/42
See application file for complete search history.

(56) References Cited

U.S. PATENT DOCUMENTS

2018/0128920 A1* 5/2018 Keilaf .................. G01S 7/4861

FOREIGN PATENT DOCUMENTS

DE    102015101902 A1    8/2016

OTHER PUBLICATIONS

German Search Report based on application No. 10 2018 207 711.8 (9 pages) dated Jan. 21, 2019 for (reference purpose only).

* cited by examiner

*Primary Examiner* — Nam D Pham
(74) *Attorney, Agent, or Firm* — Viering, Jentschura & Partner MBB (57) ABSTRACT

A distance measuring unit for measurement, based on signal time of flight, of a distance to an object, includes: an emitter configured for the emission of electromagnetic pulses, and sequentially into different emitter solid angle segments of the detection field, a receiver having a first face for detecting electromagnetic radiation, and imaging optics which image the detection field onto the first sensor face, and specifically each of the emitter solid angle segments onto a respective region of the first sensor face. The emitter solid angle segments follow one another along a scan axis, and correspondingly the regions of the first sensor face also follow one another along a first scan line. The first sensor face is subdivided into at least two pixels which adjoin one another on a first separating line. The first separating line extends at least in sections obliquely with respect to the first scan line.

15 Claims, 5 Drawing Sheets

DISTANCE MEASURING UNIT

CROSS-REFERENCE TO RELATED APPLICATION

This application claims priority to German Patent Application Serial No. 10 2018 207 711.8, which was filed May 17, 2018, and is incorporated herein by reference in its entirety.

TECHNICAL FIELD

Various embodiments relate generally to a distance measuring unit for distance measurement based on signal time of flight.

BACKGROUND

The distance measurement in question is based on a time-of-flight measurement of emitted electromagnetic pulses. If these strike an object, the pulse is partially reflected on its surface back to the distance measuring unit and can be recorded as an echo pulse by a suitable sensor. If the emission of the pulse takes place at an instant $t_0$ and if the echo pulse is detected at a subsequent instant $t_1$, the distance d to the reflecting surface of the object can be determined by means of the time of flight $\Delta t_A = t_1 - t_0$ according to $$d = \Delta t_A c / 2. \qquad \text{Eq. 1}$$

Since electromagnetic pulses are involved, c is the value of the speed of light.

SUMMARY

A distance measuring unit for measurement, based on signal time of flight, of a distance to an object, includes: an emitter configured for the emission of electromagnetic pulses, and sequentially into different emitter solid angle segments of the detection field, a receiver having a first face for detecting electromagnetic radiation, and imaging optics which image the detection field onto the first sensor face, and specifically each of the emitter solid angle segments onto a respective region of the first sensor face. The emitter solid angle segments follow one another along a scan axis, and correspondingly the regions of the first sensor face also follow one another along a first scan line. The first sensor face is subdivided into at least two pixels which adjoin one another on a first separating line. The first separating line extends at least in sections obliquely with respect to the first scan line.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

The following detailed description refers to the accompanying drawings that show, by way of illustration, specific details and embodiments in which the invention may be practiced.

Various embodiments will be explained in more detail below; the individual features in the scope of the co-ordinated claims may also be essential to various embodiments in a different combination, and distinction is furthermore not made in detail between the various claim categories.

Figure 1:
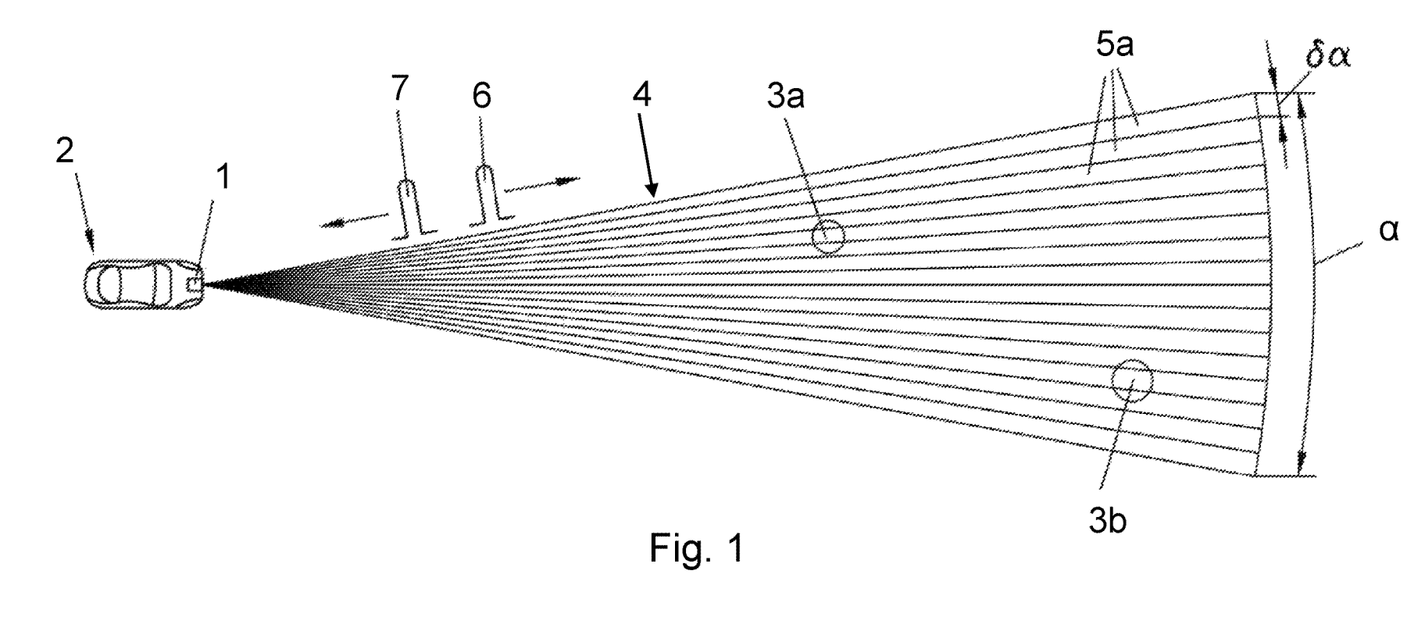
FIG. 1 shows a motor vehicle having a distance measuring unit, as well as its into emitter solid angle segments subdivided detection field in a plan view.
Figure 2:
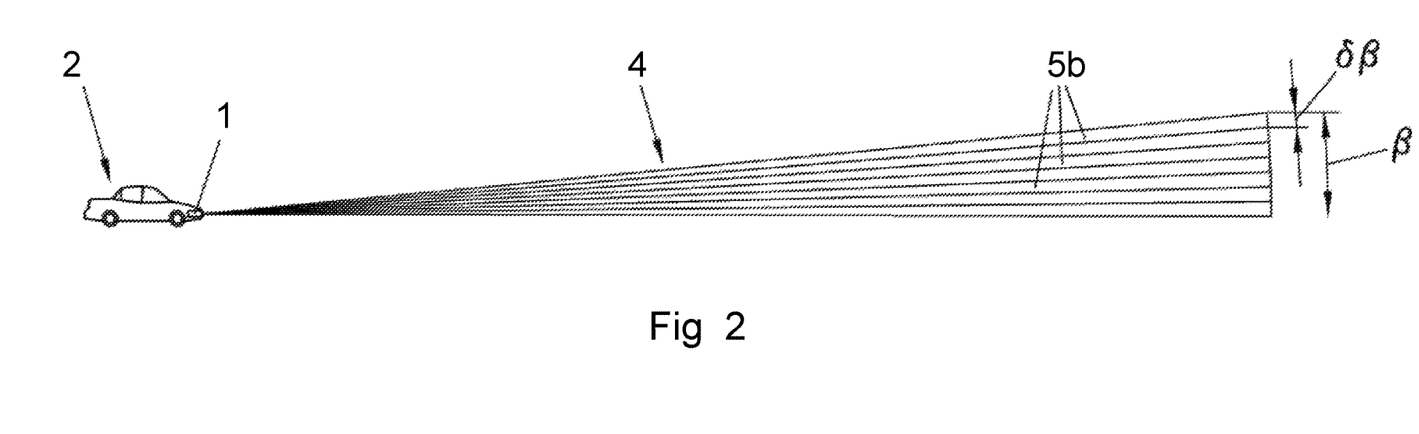
FIG. 2 shows the arrangement according to FIG. 1 in a side view and therefore the subdivision of the detection field into receiver solid angle segments.

FIG. 1, FIG. 2 show a distance measuring unit 1, which is installed in a motor vehicle 2 and is oriented in the driving direction (forward). With the distance measuring unit (e.g. implemented as a circuit including hardware and/or software components), it is possible to measure the distance to objects 3a,b, for example other vehicles or pedestrians, etc., when these objects 3a,b are in the detection field 4 of the distance measuring unit 1. The detection field 4, which has a horizontal aperture angle α and a vertical aperture angle β, is subdivided into a multiplicity of solid angle segments 5, each of which has an aperture angle δα, δβ, cf. also FIG. 2 for illustration.

The distance measurement is carried out with a resolution according to the solid angle segments 5, i.e. for example the object 3a can be distinguished from the object 3b as being located in different solid angle segments 5. Depending on the nature (size, surfaces, etc.) as well as the distance of the object, it may even be possible to differentiate within a respective object 3a,b as well. For the distance measurement, a pulse 6 is respectively emitted, which, if there is an object in the respective solid angle segment 5, returns as an echo pulse 7 and is received. The detection field 4 is subdivided horizontally into emitter solid angle segments 5a and vertically into receiver solid angle segments 5b.

Figure 3:
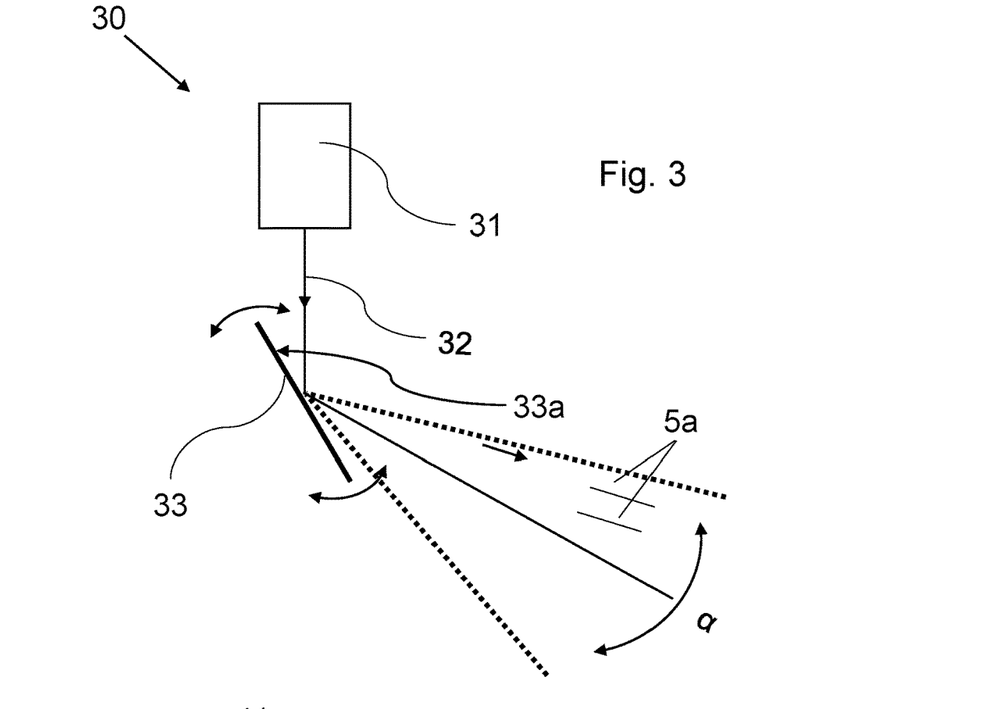
FIG. 3 shows in a schematic representation a solid angle-sensitive emitter unit as part of the distance measuring unit according to FIG. 1, FIG. 2.

FIG. 3 shows a solid angle-selective emitter unit 30, which includes a laser source 31. The laser beam 32 of the latter is guided by means of a reflector 33 oscillating to and fro. Correspondingly, in different tilt settings of the mirror 33, the pulses 6 are reflected on its mirror face 33a into the different emitter solid angle segments 5a. The pulses 6 are thus sequentially emitted and travel according to the respective tilt setting into a respective emitter solid angle segment 5a.

Figure 4:
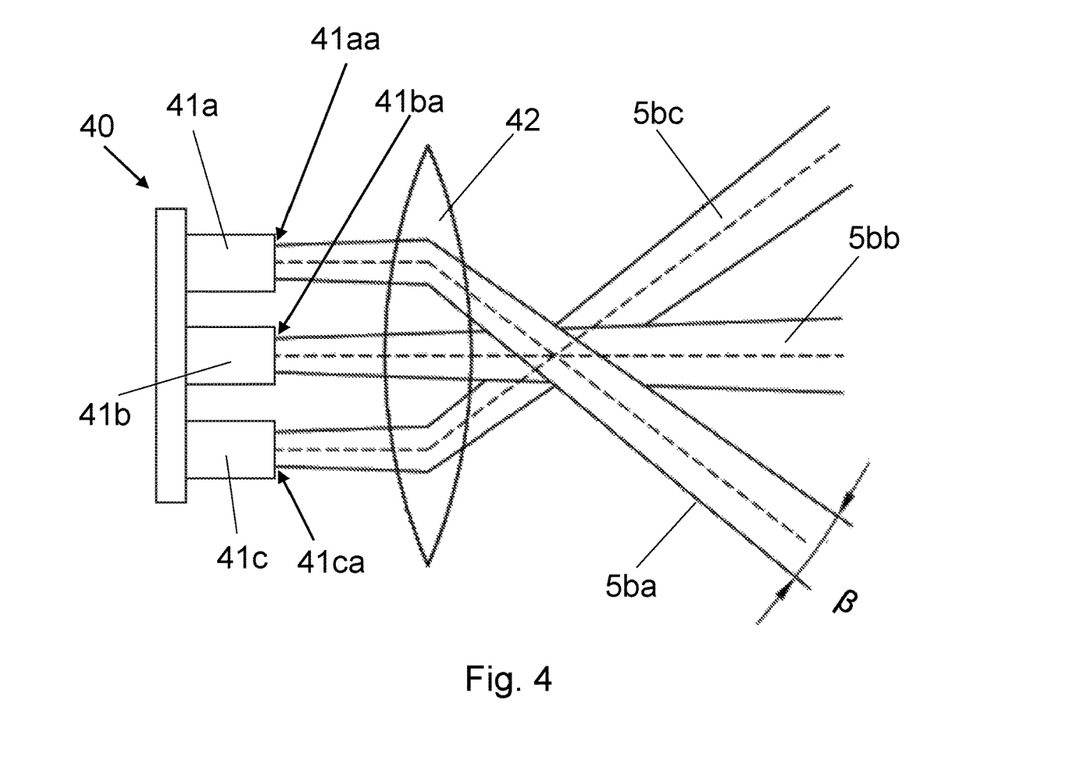
FIG. 4 shows in a schematic representation a solid angle-sensitive emitter unit as part of the distance measuring unit according to FIG. 1, FIG. 2.

FIG. 4 shows a solid angle-sensitive receiver unit 40 having in the present case three individual receivers 41*a,b,c*. These respectively include a sensitive sensor face 41*aa,ba,ca* which is used for detection of the echo pulses 7 incident thereon. In the present case, the receivers 41*a,b,c* are represented with a certain distance from one another for the sake of clarity, although in practice they may also be placed directly next to one another or configured integrally, for example as regions of the same semiconductor component. The sensor faces 41*aa,ba,ca* are preceded by optics 42 which associate a respective sensor face 41*aa,ba,ca* with a respective receiver solid angle segment 5*ba,bb,bc*. The optics 42 image the sensor faces 41*aa,ba,ca* to infinity; conversely, they guide the echo pulses 7 incident from a respective receiver solid angle segment 5*ba,bb,bc* onto the respectively assigned sensor face 41*aa,ba,ca*.

On the emitter side, the detection field 4 is subdivided into the emitter solid angle segments 5*a* (FIG. 1, FIG. 3), and on the receiver side it is subdivided into the receiver solid angle segments 5*b* (FIG. 1, FIG. 4). The one subdivision exists in relation to the horizontal (FIG. 2, FIG. 3), and the other the vertical (FIG. 1, FIG. 4). Considered overall, the detection field 4 is therefore subdivided in a matrix fashion.

Figure 5:
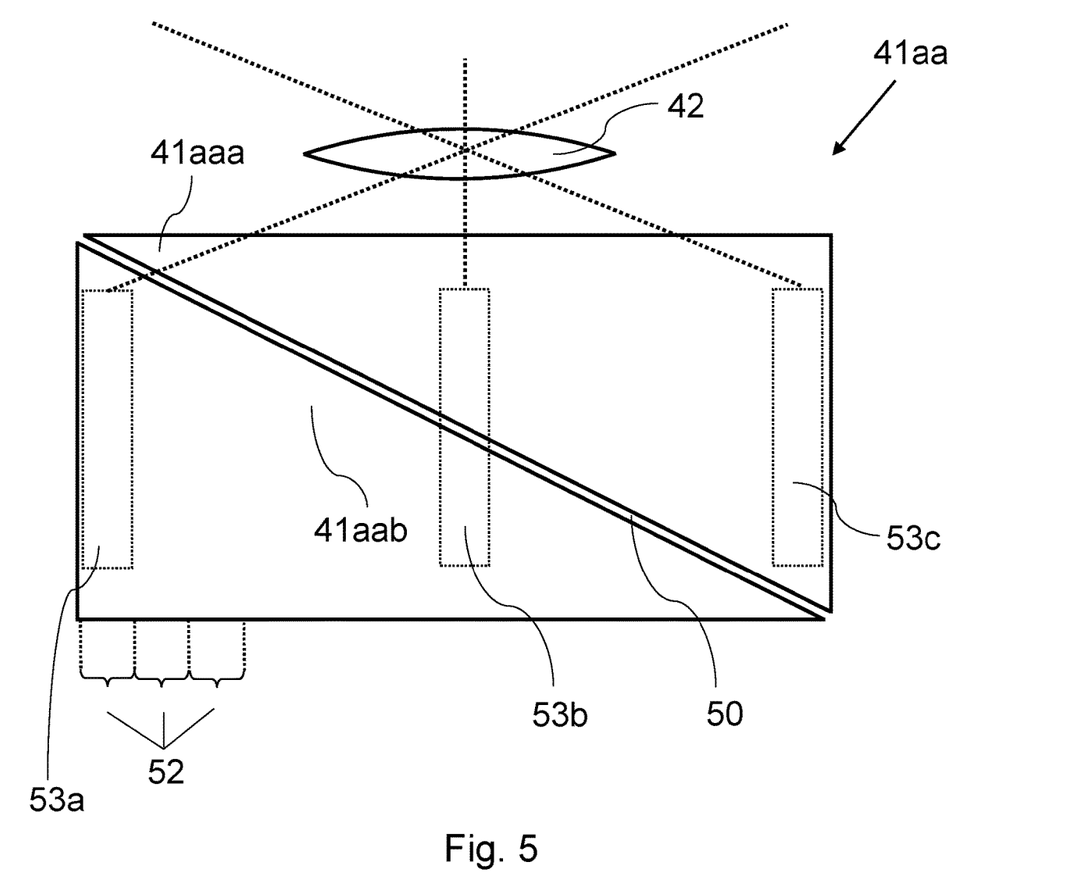
FIG. 5 shows a sensor face of the receiver unit according to FIG. 4 in detail view, from which subdivision into two pixels can be seen.

FIG. 5 shows the sensor face 41*aa* in detail, specifically in a plan view, i.e. looking from the viewpoint of the incident echo pulse 7. The sensor face 41*aa* is subdivided into two pixels 41*aaa,aab*; these adjoin one another along a separating line 50. The latter is oriented obliquely with respect to a scan line 51.

Along the scan line 51, different regions 52 of the sensor face 41*aa* follow one another, a respective region 52 being associated by means of the optics 42 with a respective emitter solid angle segment 5*a*.

Specifically, the echo pulses 7 incident from a respective receiver solid angle segment 5*b* do not, as might be suspected from FIG. 4, always strike the same position of the respective sensor face 41*aa,ba,ca*. They do this respectively only in the side view according to FIG. 4, i.e. in relation to the vertical direction. In the horizontal direction, however, the echo pulses 7 incident from the various emitter solid angle segments 5*a* are offset with respect to one another (perpendicular to the plane of the drawing in FIG. 4).

FIG. 5 illustrates the consequence with the aid of three spots 53*a,b,c* indicated by dots, which result from echo pulses 7 from different emitter solid angle segments. The spots 53*a,c* result from an emitter-side scan of the edges of the detection field 4, while the spot 53*b* results from a central emitter solid angle segment 5*a*.

Because of the subdivision into the pixels 41*aaa,aab*, specifically because of the oblique separating line 50, different signal components are detected for the different spots 53*a,b,c*. In the case of the spot 53*b*, these are about equal in size, while in the case of the spot 53*a* only the signal component of the one pixel 41*aab* is detected, while in the case of the spot 53*c* only that of the other pixel 41*aaa* is detected. The detected signal components correlate with the position of the spot 53*a,b,c*, and conversely it is thus possible to determine the emitter solid angle segments 5*a* from which the respective echo pulse 7 comes (because of the position/solid angle conversion of the optics 42).

As presented in detail in the introduction to the description, this may be used in order to determine and/or monitor the oscillation or tilting of the mirror 33.

Figure 6:
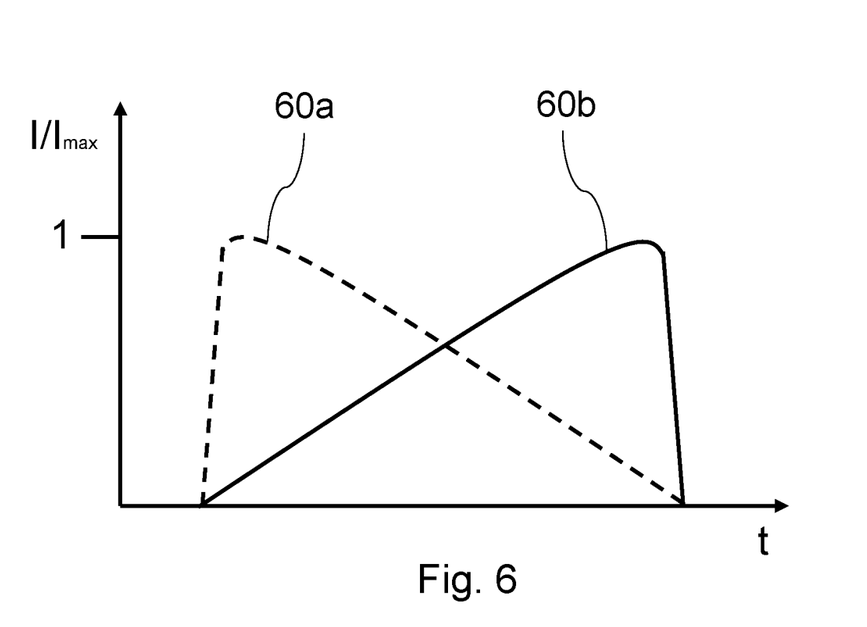
FIG. 6 shows in a diagrammatic representation signal components in time profile, which are detected by the pixels according to FIG. 5.

FIG. 6 again illustrates the signal components 60*a,b* for the situation discussed with the aid of FIG. 5 in a diagrammatic representation. The time (t) is plotted on the X axis, and the normalized signal intensity (I) is plotted on the Y axis. As has also already been made clear from the explanations above, the signal components 60*a,b* change counter to one another, and the evaluation (position determination) may in detail be carried out, for example, by forming the quotient.

Figure 7:
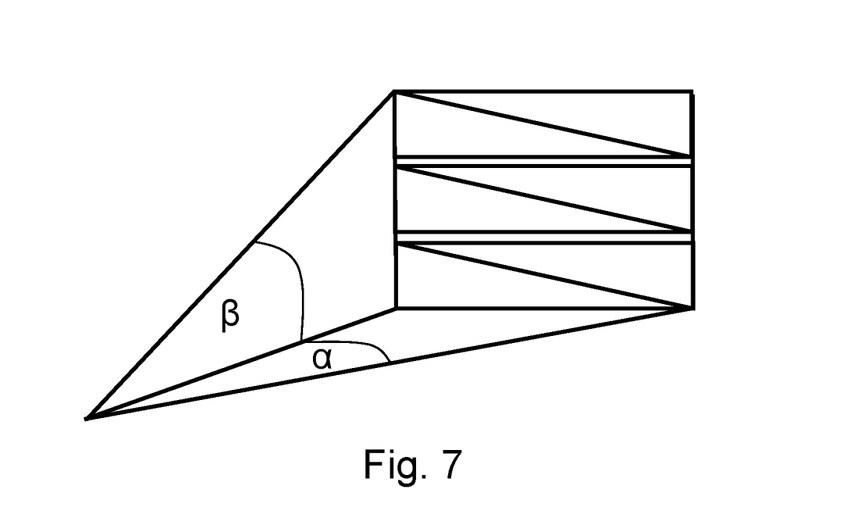
FIG. 7 shows in a schematic representation the pixel structure of the receiver unit according to FIG. 4 in the far-field.

FIG. 7 shows the detection field 4 in a schematic oblique view, specifically the subdivision which is obtained in the far-field. Essentially, a (virtual) image of the pixel structure through the optics 42 into the far-field is thus shown. FIG. 7, in a similar way to FIG. 4, in this case assumes three sensor faces 41*aa,ba,ca*, i.e. there are then a total of six pixels with the assumption of pixelation according to FIG. 5.

Figure 8A:
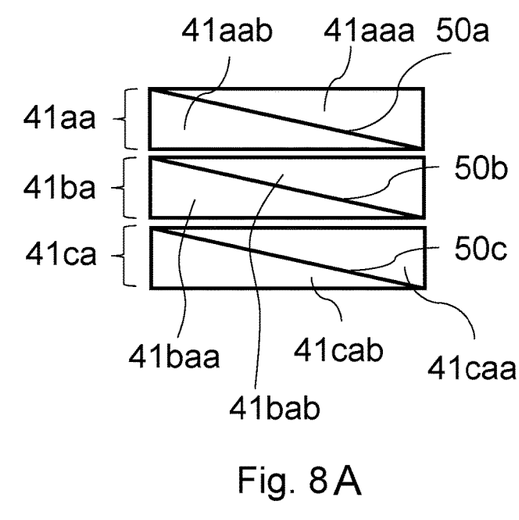
FIGS. 8A and 8B show possibilities of different arrangement of separating lines between pixels of neighboring sensor faces.
Figure 8B:
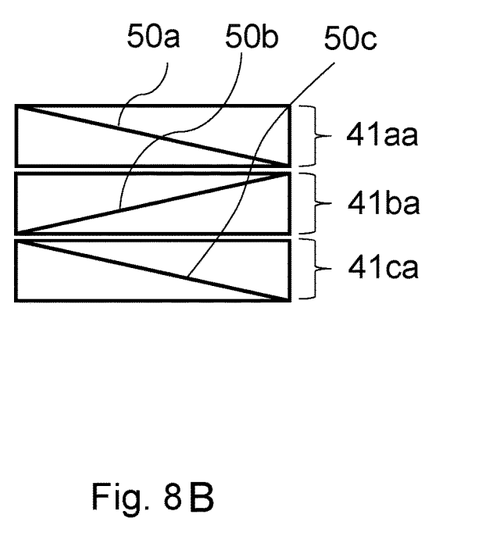

FIG. 8A, FIG. 8B again shown on the sensor plane a plurality of sensor faces 41*aa,ba,ca*, which are respectively subdivided into two pixels. In detail, the two figures then differ in the orientation of the separating lines 50*a,b,c*, which are all parallel to one another in one case (FIG. 8A), but in the other case are pairwise angled with respect to one another (FIG. 8B).

Figure 9:
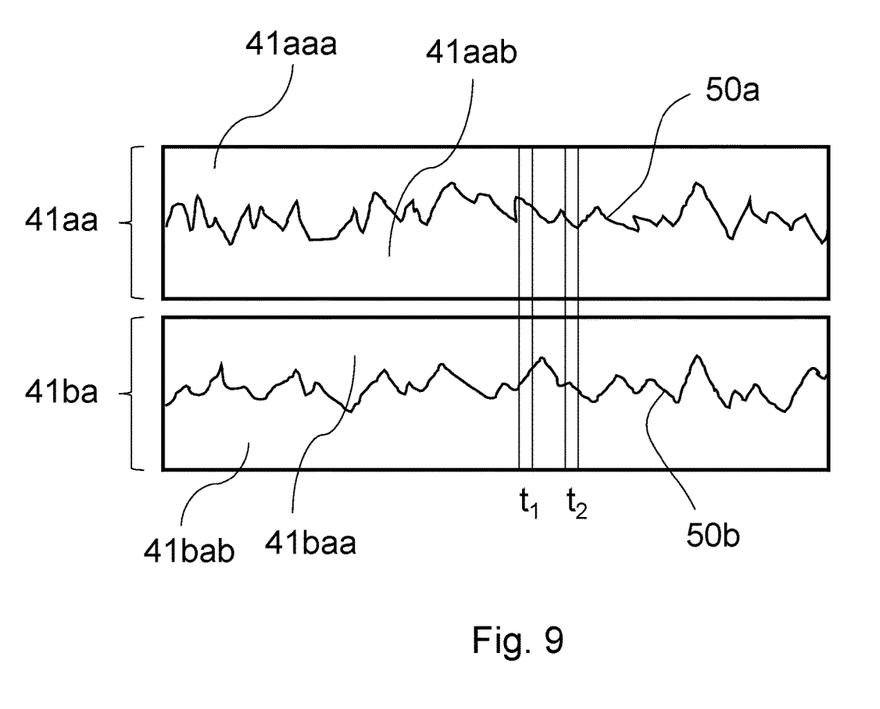
FIG. 9 shows two sensor faces, which are respectively subdivided into two pixels by a separating line having a plurality of curvature changes.

FIG. 9 shows two sensor faces 41*aa,ba*, the separating lines 50*a,b* of which, contrary to the previous representation, run not in a straight line but respectively with a multiplicity of direction changes. During a scan movement (from left to right or right to left), the respectively detected signal components therefore do not change constantly, but rather they respectively increase and decrease respectively. In each pair, the pixels 41*aaa,aab* and 41*bab,baa* may have the same area, although this is not compulsory. In principle, the outer edges of the respective sensor face could have a profile with curvature changes, although this is not necessary.

The pixel geometry shown in FIG. 9 is improved with a view to optimizing the resolution, and the signal components advantageously do not vary periodically. As a consequence, objects are essentially scanned with a kind of dithering in the vertical direction, because each pulse illuminates differently high pixels in the vertical direction. The resolution can therefore be increased in this direction.

Various embodiments provide a distance measuring unit.

The detection field of this distance measuring unit is subdivided into a plurality of emitter solid angle segments, which is achieved by a solid angle-selective emitter unit. This emits sequentially into the individual emitter solid angle segments, and "listening" is respectively carried out for a particular pause duration for whether an echo pulse comes back from a respective solid angle segment. This gives a solid angle resolution on a scan axis, along which the emitter solid angle segments follow one another. Figuratively speaking, the emitter solid angle segments may be regarded as wedges which, placed next to one another along the scan axis, fan out the detection field.

The distance measuring unit furthermore includes a receiver unit having a sensitive sensor face and optics, which image the detection field onto the sensor face (respectively the sensor face into the detection field or far-field). The optics may, on the one hand, be necessary in order to guide the echo pulses onto the sensor face and therefore make them detectable at all. On the other hand, the imaging optics necessarily entail a solid angle/position conversion, i.e. the solid angle distribution of the detection field is converted into a position distribution on the sensor face. Echo pulses incident from the different emitter solid angle segments are consequently guided onto a respectively different region of the sensor face, which could at first be regarded as problematic (larger sensor face required, etc.).

One basic concept in the present case is to expediently use this position distribution resulting on the sensor face in order to obtain additional information in the course of the evaluation. If the solid angle selectivity of the emitter unit is produced, for example, with a tillable mirror face (see below), the additional information may for example be used in order to determine the mirror position (as an alternative to a position-synchronous sync signal or in combination therewith for diagnosis). According to various embodiments, to this end the sensor face is subdivided into at least two pixels, and these adjoin one another on a separating line which is oblique with respect to a scan line. The latter is in the form of a connecting line of the individual regions of the sensor face which are each associated by means of the imaging optics with a respective one of the emitter solid angle segments, specifically as a line through the surface centroids of the regions. Thus, if an object is arranged "centrally" in the respective emitter solid angle segment, assuming the latter is imaged onto the corresponding region, this object is imaged onto the scan line, and specifically onto the surface centroid of the respective region.

In relation to this scan line along which, figuratively speaking, the echo pulses migrate over the sensor face, the separating line is oriented obliquely between the at least two pixels, at least in one or more sections. The separating line thus extends neither entirely parallel nor overall perpendicularly to the scan line. In various embodiments, the lines intersect at least once, and depending on the configuration several times (cf. FIG. 9 for illustration).

With the subdivision of the sensor face into pixels, a separate signal component may be read for each pixel. If it is assumed for illustration that an echo pulse generates a uniform irradiance distribution at a spot on the sensor face, the signal component detected by a respective pixel is determined according to the surface component at which the spot lies on the respective pixel (if the same sensitivity is furthermore assumed for the pixels, which is preferred but generally not compulsory). If the spot migrates along the scan line in the course of time because the echo pulses are coming back from the different emitter solid angle segments, the signal components respectively detected by the pixels change because of the obliquely oriented separating line (if an object extended relatively uniformly over at least some solid angle segments in the detection field is assumed).

From the signal components detected at a respective instant, also from their change in the course of time, it is therefore possible for example to determine the region of the sensor face in which the respective radiation power is detected, i.e. from which emitter solid angle segment the corresponding echo pulse comes. In this way, for example, the function of the solid angle-selective emitter unit, e.g. of a tillable mirror face, may be checked or monitored. If laser pulses are emitted, for example, a mirror being stationary could lead to a significantly increased laser power in the corresponding emitter solid angle segment, which may represent a photobiological risk (eye safety). This is one possibility of using the subject-matter of various embodiments; in relation to the possibilities with a view to "resolution improvement", reference is made to the description below.

For illustration, the size of the sensor face, which specifically may also depend on the resolution of the optics and the scanning angle (aperture angle of the detection field in the scan direction), may for example be at least 1000 µm, along the scan axis or scan line (with a possible upper limit at most at 2500 µm) and, perpendicularly thereto, for example, at least 100 µm (with a possible upper limit at most at 500 µm). The size of an echo pulse spot, which may be approximately circular, then also ideally lies in the latter range (100 µm to 500 µm).

Various embodiments may be found in the dependent claims and the disclosure as a whole, distinction not always being made in detail between device and method or use aspects in the presentation of the features; implicitly, at least, the disclosure is to be interpreted in relation to all claim categories. Thus, for example, if a distance measuring unit suitable for particular operation is described, a disclosure of a corresponding operating method is at the same time to be understood therein, and vice versa.

The imaging optics associate a respective emitter solid angle segment (also referred to below merely as a "solid angle segment" or "segment") with the sensor face, so that the individual regions of the latter are established. The division of the detection field into the solid angle segments in turn results from the solid angle-selective emitter unit. In general, an exemplary use of the distance measuring unit may be in the automotive sector, in which case the detection field is then preferably subdivided into the emitter solid angle segments in the horizontal direction. As explained in detail below, there may also be further subdivision on the receiver side, i.e. the receiver unit may include a plurality of sensor faces (which for their part may then in turn respectively be subdivided into pixels). In the example just mentioned, the detection field would then e.g. be subdivided in the vertical direction on the receiver side, so that overall matrix-like or two-dimensional resolution may be achieved.

The imaging optics, which associate the detection field with the sensor face or faces, may generally also be configured to be reflective, i.e. include a mirror face. Exclusively refractive optics may be provided. For example, it may be a converging lens, which may also be constructed as a lens system consisting of a plurality of individual lenses which may image the detection field onto the sensor face(s), which functionally corresponds to a Fourier transform.

The "oblique" separating line may generally make an angle of for example at least 10° or 20° with the scan line, in which case possible upper limits (independent thereof) may for example be at most 80°, 70° or 60° (respectively increasingly preferred in order of mention). In this case, the smaller of two angles which the lines make with one another is considered. The corresponding value ranges are also intended to be disclosed in respect of a separating line extending obliquely only in sections (and they correspondingly apply in at least one section). In the case of a separating line extending not in a straight line but with a curvature, the angle between a tangent thereto and the scan line is taken.

In general, the solid angle-selective emission may also be carried out by providing a plurality of individual emitters, to which their own solid angle segment is respectively assigned. During operation, the emitters then emit successively into their respective solid angle segment. To this end, the individual emitters may for example be arranged next to one another in a row, and this position distribution may then, for example, be converted into the solid angle distribution by common optics (in general, to this end each individual emitter could also be assigned its own optics). As corresponding emitter optics, a converging lens (or a lens system) may for example be provided, which then for example images the emission faces to infinity.

For example, at least 10, 20 or 30 individual emitters may be arranged next to one another in a row (with possible upper limits at most at 1000, 500 or 100). In general, a single row may also be envisioned, although there may be for example at least 2 or 3 rows (with possible upper limits at, for example, at most 50, 40, 30 or 10).

In various embodiments, however, the solid angle selectivity of the emitter unit is produced with a mirror unit by means of which the pulses from the emitter are reflected into the detection field. The mirror unit has different tilt states, and a respective tilt state associates a respective solid angle segment with the emitter. In this case as well, a laser source is preferred as an emitter, which may for example also be constructed from a plurality of individual emitters, for example a plurality of laser diodes (in order to increase the power). The individual laser beam bundles may, for example, be combined by beam compression optics and sent onto the mirror unit in superimposed form. This, however, is generally not compulsory, and the concept of various embodiments may also be implemented with a single laser source.

In general, the mirror unit may for example also be produced with a plurality of respectively separate adjustable mirror faces, to which one of the emitter solid angle segments is respectively assigned. In a matching tilt setting of the respective mirror face, the pulse incident from the emitter is then reflected into the solid angle segment (while in another setting state it is not, which leads to the different tilt states).

In various embodiments, the mirror unit includes a tillable mirror face, which emits the pulse incident from the emitter into a respective solid angle segment depending on the tilt setting. The mirror face occupies different tilt settings, each corresponding to a solid angle segment. In various embodiments, oscillating operation may be provided in this case, i.e. the mirror face may be moved to and fro in oscillation between two maximum tilt settings. The individual tilt settings are thus run through in oscillating movement. In contrast to the possibility described in the previous paragraph (a plurality of mirror faces, set blind when the respective segment is not being pulsed), one effect may for example lie in improved efficiency because the total laser power always enters the solid angle segment corresponding to the respective tilt setting (while the laser power is lost in the case of the mirror faces set blind).

In general, with respect to the solid angle selectivity which is produced by a mirror unit, one effect of the present subject-matter may lie in its detectability, or monitorability. In the case of the tillable mirror face, for example, the position determination of the respective echo pulse and therefore solid angle segment assignment may, for example, even replace readout of the mirror setting, i.e. for example it is not necessary to detect a position-synchronous sync signal (which may offer cost advantages). For example because of the safety relevance, however, the present subject-matter may also supplement a different type of position determination and therefore a possibility of diagnosis or monitoring.

Also, independently of the way in which the solid angle selectivity is specifically produced on the emitter side, the radiation may be infrared radiation, i.e. wavelengths of for example at least 600 nm, 650 nm, 700 nm, 750 nm, 800 nm or 850 nm (increasingly preferred in order of mention). For example, about 905 nm may be provided, in which case upper limits may be at most at 1100 nm, 1050 nm, 1000 nm or 950 nm (respectively increasingly preferred in order of mention). Another possible value may for example be about 1064 nm, which entails advantageous lower limits of at least 850 nm, 900 nm, 950 nm or 1000 nm and (independently thereof) upper limits of at most 1600 nm, 1500 nm, 1400 nm, 1300 nm, 1200 nm or 1150 nm (respectively increasingly preferred in order of mention). Exemplary values may also be about 1548 nm or 1550 nm, which entails lower limits of at least 1350 nm, 1400 nm, 1450 nm or 1500 nm and (independently thereof) upper limits of at most 2000 nm, 1900 nm, 1800 nm, 1700 nm, 1650 nm or 1600 nm (respectively increasingly preferred in order of mention). In general, however, wavelengths in the far IR may for example also be envisioned, for example at 5600 nm or 8100 nm.

In general, the measurement duration per emitter solid angle segment is determined according to the desired range. Two times the range is the maximum path of the pulse and echo pulse, which with the speed of light establishes the measurement duration. For a range of 300 m, this must for example be 2 μs.

A pulse is a time-limited quantity which is emitted in order then, in the case of reflection at the object, to be detected by a sensor of the distance measuring unit with a time offset. A pulse width, taken according to the full width at half maximum (FWHM), may, for example, be at most 1 ms, and e.g. even much less, i.e. increasingly preferably in order of mention at most 800 μs, 600 μs, 400 μs or 200 μs, or even less, i.e. at most 1000 ns, 900 ns, 800 ns, 700 ns, 600 ns, 500 ns, 400 ns, 300 ns, 200 ns, 100 ns, 80 ns, 60 ns, 40 ns, 30 ns, 25 ns, 20 ns, 15 ns, 10 ns, 5 ns, or 2 ns (increasingly preferred in order of mention). In principle, a pulse which is as short as possible may be provided, for technical reasons lower limits may for example be at least 0.001 ns, 0.01 ns or 0.1 ns.

In various embodiments, the distance measuring unit is adapted to match with one another signal components which are detected by the at least two pixels, in order to determine the position of the relevant echo pulses, specifically of the irradiance distribution generated thereby, along the scan line. This "adaptation" means, for example, that the distance measuring unit is equipped with or connected to a corresponding evaluation unit. The evaluation unit may, for example, be provided on the basis of a microcontroller as an integral component part, although the chosen function may for example also be (partially) remotely located, for instance in an external computation unit, for example the on-board computer in the case of a motor vehicle.

In the course of the "matching" of the signal components, e.g. not only are the signal components detected at a respective instant compared with one another, for instance by forming the quotient and/or difference, but e.g. additionally a match with the previously detected signal components may be carried out. Very generally, the matching means putting in relative proportion, i.e. comparison with one another in the course of the evaluation. In this way, for example, the aforementioned "migration" of the spot, i.e. of the irradiance distribution generated by the echo pulses, over the sensor face may be established. The match in the time profile may, for example, also help to establish or even eliminate irregularities occurring on the object side (if the object does not uniformly fill neighboring segments).

As already mentioned, in a preferred configuration, the region of the sensor face, and therefore the assigned solid angle segment, is determined from the different signal components. This corresponds to a particular tilt state of the mirror unit, in particular a tilt setting or oscillation position of the tiltable mirror face (see above). This association with the tilt states allows evaluation or monitoring of the mirror unit, see above.

Combination with an oscillatorily tilted mirror face, which may be moved in a resonantly oscillating fashion, may be provided. One example of this may be a MEMS mirror. This is because, in the case of a periodic or resonant oscillation, for the position determination it is then only necessary to determine the oscillation period, from which the mirror trajectory is necessarily derived. The matching of the signal components may then, for example, be carried out as a Fourier analysis of the signal ratio. From this, for example, the lowest occurring frequency component may be identified as that of the mirror oscillation.

In various embodiments, the sensor face has a rectangular base shape. In general, for example, this is not intended to exclude a certain curvature of the side edges, which may for example also result from a sensor face which is curved overall. In various embodiments, the separating line extends diagonally through the sensor face, i.e. from one corner to the opposite corner. The scan line is preferably parallel to a side edge of the rectangle, e.g. to the longer side edge (which is preferably horizontal and accordingly correlates with a generally larger aperture angle in this direction). In an idealized consideration, the scan line and the separating line for example may intersect centrally in the sensor face, i.e. at its surface centroid. The variants mentioned at this point may for example be advantageous in respect of the position determination, i.e. may e.g. be used in the case of monitoring/evaluation of tilt states of the mirror unit.

In various embodiments, the separating line extends in a straight line, i.e. the pixels adjoin one another along a straight line through the sensor face. In respect of detection of the "migration" of the spot or spots along the scan line, the straight separating line may for example give a more or less uniform change in the signal components, which may be provided in respect of the evaluation.

In general, the sensor face, or the pixels, may be provided according to their basic structure as a photodiode, i.e. for example as a PIN diode, APD (avalanche photodiode) or SPAD (single-photon APD), or may also be a photomultiplier. In various embodiments, the pixels of the sensor face are formed on the same component, for example on the same semiconductor component. If further sensor faces are provided, which themselves are in turn respectively subdivided into pixels, these with one another may likewise be arranged on the same component, but a separate component may also be provided sensor face. In various embodiments, the various pixels or sensor faces have the same sensitivity.

The variants discussed below relate in particular to the "resolution improvement" mentioned in the introduction.

In various embodiments, the separating line is provided with a multiplicity of direction changes, i.e. for example the pixels of the sensor face adjoin one another along a jagged or multiply curved separating line. Because of the direction changes, the signal components detected by the pixels along the scan line change; they repeatedly increase and decrease, i.e. fluctuate to some extent. In this context, further subdivision of the sensor face may also be envisioned, i.e. it could for example be divided according to a Penrose pixel pattern, and tiling or tessellation is possible (the evaluation may be carried out in a so-called supersolution method).

On the other hand, in the case of resolution improvement as well, subdivision of the sensor face into precisely two pixels may however be provided, cf. also the exemplary embodiments for illustration. The separating line, however, does not then run in such a way that a spot (with irradiance distribution) moved in a direction along the scan line entails a constant increase of the one signal component and a correspondingly constant decrease of the other signal component (which is preferred in the case of position determination, see above). Instead, in the model case mentioned, each of the signal components should increase and decrease again several times.

A corresponding separating line may be provided e.g. when, in addition to common evaluation, the individual pixels of the sensor face can also be read out or evaluated separately. This may, for example, increase the resolution perpendicularly to the scan direction, i.e. vertically in the case of the orientation presented above. In practice, the objects detected by the distance measuring unit may also have more complex shapes (not always straight-line edges, etc.), which, expressed in a simplified way, with a certain variance on the receiver side as a result can often be detected better.

In various embodiments, sampling or evaluation of the pixels may be carried out by dithering, i.e. a fixed, clearly contoured resolution is "blurred" by a stochastic signal. In relation to one of the emitter solid angle segments, the resolution of one pixel may be significantly better than that of the other, and in a neighboring segment the ratio may then be precisely reversed. Overall, there is a corresponding difference along the scan line repeatedly, i.e. first one pixel then the other has a better resolution. The likelihood that an object which partially fills some of the solid angle segments is detected only with "poor" resolution may therefore be reduced, for example in comparison with straight-line division.

In various embodiments, the separating line runs in such a way that the increase and decrease of the signal components along the scan line is aperiodic, i.e. it does not follow a repeating pattern. Generally, in these considerations, because the signal components change counter to one another, a ratio thereof is considered. Thus, for example, the quotient may repeatedly increase and decrease.

The following variants relate both to the "resolution improvement", i.e. the separating line with curvature changes, and to the position determination (monitoring, safety, etc.).

In various embodiments, the receiver unit includes a second sensor face, which is itself subdivided into at least two pixels. The separating line of the second sensor face may also be oblique with respect to a scan line along which the regions of the second sensor face follow one another. In general, all indications or specifications given implicitly or explicitly above for the "first" sensor face may also provided in the case of a "second" sensor face, or also for further sensor faces, and they are correspondingly intended to be disclosed. With respect to the position determination, for example, a separating line extending diagonally, e.g. in a straight line, through the second sensor face may thus also be provided.

If there are a plurality of sensor faces provided, these are arranged following one another perpendicularly to the scan movement, i.e. perpendicularly to the scan lines. In this way, as mentioned in the introduction, a resolution can also be achieved in this direction, from which receiver solid angle segments are given. The emitter solid angle segments subdivide the detection field along the scan axis, and the receiver solid angle segments subdivide it at an angle (e.g. perpendicularly) thereto. Functionally, a respective pulse is then emitted into a particular emitter solid angle segment and, by the receiver unit, it is possible to resolve which region of this emitter solid angle segment echo pulses are returning from.

In various embodiments, there may be at least three sensor faces placed next to one another, i.e. the detection field is subdivided into at least three receiver solid angle segments (e.g. in the vertical direction). Possible upper limits may for example be at most at 20, 15 or 10 sensor faces. Overall, in this case not all sensor faces have to be subdivided into pixels, although this may be provided, e.g. in connection with a respective oblique separating line.

In various embodiments, the separating lines of the first and the directly neighboring second sensor face are at an angle to one another, i.e. not parallel. If a multiplicity of sensor faces are provided, an arrangement may be provided in such a way that the separating lines of nearest-neighbor sensor faces are respectively at an angle to one another, but those of the next-nearest neighbor sensor faces are parallel to one another. This is one possibility, although in general an arrangement is of course also possible in which nearest-neighbor separating lines or even all separating lines are parallel to one another.

In various embodiments, the distance measuring unit is adapted to form an average value from the signal components detected by the various pixels. In this case, different weighting of the pixels is generally also possible, although the components may be included with the same factor. The average value formation need not necessarily be carried out permanently and/or as a sole evaluation possibility; it may, for example, also be carried out in parallel with separate readout or evaluation of the individual pixels.

In various embodiments, average value formation takes place in respect of the position determination or position monitoring. To this end, a first average value is preferably formed over the signal components of those pixels whose signal component increases in a direction along the scan line (for a spot which is assumed to be steady, see above) and a second average value is formed over those pixels whose signal components decrease along the same direction. With respect to the implementation of the average value formation in detail, there are various possibilities; for example, the respective signal components may initially be averaged and then a quotient may be formed, although likewise averaging over the quotients formed beforehand from each sensor face is also possible.

In general, the average value formation may in practice help to reduce the influence of the variability of the detected scene. In this case, it is possible to average not only within a respective scan but also, for example, over successive scans.

Various embodiments also relate to a method for operating a distance measuring unit as disclosed here. In this case, very generally, the signal components detected by the various pixels are evaluated. The signal components may e.g. be used for position determination (see above), for example by quotient formation. As an alternative or in addition, the signal components may also be used separately, for example in order to improve the (vertical) resolution. A change between different operating modes is possible, i.e. between separate and common evaluation or detection of the signal components; on the other hand, the signal component may however also be read out individually and then likewise used for common and separate evaluation.

Various embodiments also relate to the use of a distance measuring unit as disclosed here in a motor vehicle, for example a truck or a motorcycle or a motorcar. Application in a semiautonomously or fully autonomously driving vehicle may be provided. In general, however, application in an aircraft or watercraft may also be envisioned, for instance an airplane, a drone, a helicopter, train or ship. Further application fields may be in the field of indoor positioning, i.e. detecting the position of persons and objects inside buildings; detection of a plant structure (morphological detection in plant cultivation) is also possible, for example during a growth or ripening phase; applications may also be in the field of control (tracking) of effect lighting in the entertainment field, and control (tracking) of a robot arm in the industrial and medical fields is likewise possible.

A vehicle may include a multiplicity of distance measuring units according to various embodiments, the detection field or the field of view (FOV) of each of the distance measuring units preferably being spatially disjunct from the other distance measuring unit or units. In this way, a greater overall solid angle range can be detected (in front of, to the side of, behind, above the vehicle). If the distance measuring units have different IR laser wavelengths, the detection fields may also not be disjunct, i.e. at least partially overlap. The distance measuring units may, for example, be integrated into existing vehicle headlamp systems.

LIST OF REFERENCE SIGNS distance measuring unit 1
motor vehicle 2
objects 3a,b
detection field 4
solid angle segments 5
emitter solid angle segments 5a
receiver solid angle segments 5b
pulses 6
echo pulses 7
emitter unit 30
laser source 31
laser beam 32
mirror unit 33
mirror face 33a
receiver unit 40
sensor face (first) 41aa
pixel 41aaa,aab
sensor face (second) 41ba
pixel 41baa,bab
sensor face (third) 41ca
optics 42
separating line 50
first separating line 50a
second separating line 50b
third separating line 50c
scan line 51
regions 52
spots 53a,b,c
signal components 60a,b While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A distance measuring unit for measurement, based on signal time of flight, of a distance to an object located in a detection field, the distance measuring unit comprising:
   an emitter unit which is configured for an emission of electromagnetic pulses, and specifically sequentially into different emitter solid angle segments of the detection field,
   a receiver unit having a first sensitive sensor face for detecting electromagnetic radiation, i.e. for receiving echo pulses after a distance-dependent time of flight, and imaging optics which image the detection field onto the first sensitive sensor face, and specifically each of the emitter solid angle segments onto a respective region of the first sensitive sensor face, wherein the emitter solid angle segments follow one another along a scan axis, and correspondingly the regions of the first sensitive sensor face also follow one another along a first scan line, wherein the first sensitive sensor face is subdivided into at least two pixels which adjoin one another on a first separating line, wherein the first separating line extends at least in sections obliquely with respect to the first scan line.

2. The distance measuring unit of claim 1,
wherein the emitter unit comprises a mirror unit by means of which the pulses are emitted into the detection field, and specifically into a respective emitter solid angle segment in a respective tilt state of the mirror unit.

3. The distance measuring unit of claim 2,
wherein the mirror unit comprises a tiltable mirror face, and the emitter solid angle segments are spanned by tilting the mirror face, i.e. a respective tilt setting of the mirror face is assigned to each emitter solid angle segment.

4. The distance measuring unit of claim 2,
which is adapted to match signal components which are detected by the at least two pixels, and to determine therefrom the position of a respective irradiance distribution, which a respective echo pulse generates on the first sensitive sensor face, along the first scan line.

5. The distance measuring unit of claim 3,
which is adapted to determine the respective tilt setting of the tiltable mirror face from the signal components detected by the at least two pixels.

6. The distance measuring unit of claim 1,
wherein the first sensitive sensor face has a rectangular base shape, through which the first separating line extends diagonally.

7. The distance measuring unit of claim 1,
wherein the first separating line extends in a straight line.

8. The distance measuring unit of claim 1,
wherein the first separating line runs with a multiplicity of direction changes in such a way that a ratio of signal components which are detected by the at least two pixels in a respective region of the first sensitive sensor face, i.e. which are detected for a respective emitter solid angle segment, repeatedly increases and decreases along the first scan line.

9. The distance measuring unit of claim 8,
wherein the increase and decrease of the ratio of the signal components along the first scan line is aperiodic.

10. The distance measuring unit of claim 1,
wherein the receiver unit comprises a second sensitive sensor face, which is subdivided into at least two pixels which adjoin one another on a second separating line, which second separating line extends at least in sections obliquely with respect to a second scan line along which regions of the second sensor face, which are assigned to the emitter solid angle segments by means of the optics, follow one another.

11. The distance measuring unit of claim 10,
wherein the first separating line and the second separating line are at an angle to one another.

12. The distance measuring unit of claim 11,
which is adapted to form an average value from signal components which are detected by the at least two pixels of the first sensitive sensor face, and signal components which are detected by the at least two pixels of the second sensor face.

13. The distance measuring unit of claim 12,
wherein the mirror unit comprises a tiltable mirror face, and the emitter solid angle segments are spanned by tilting the mirror face, i.e. a respective tilt setting of the mirror face is assigned to each emitter solid angle segment, wherein the distance measuring unit is adapted to determine the position of the respective irradiance distribution, which a respective echo pulse generates on the first sensitive sensor face and the second sensor face, along the first and second scan lines with the aid of the average value formed from the signal components.

14. A motor vehicle, comprising:
a distance measuring unit, comprising:
an emitter unit which is configured for an emission of electromagnetic pulses, and specifically sequentially into different emitter solid angle segments of the detection field, a receiver unit having a first sensitive sensor face for detecting electromagnetic radiation, i.e. for receiving echo pulses after a distance-dependent time of flight, and imaging optics which image the detection field onto the first sensitive sensor face, and specifically each of the emitter solid angle segments onto a respective region of the first sensitive sensor face, wherein the emitter solid angle segments follow one another along a scan axis, and correspondingly the regions of the first sensitive sensor face also follow one another along a first scan line, wherein the first sensitive sensor face is subdivided into at least two pixels which adjoin one another on a first separating line, wherein the first separating line extends at least in sections obliquely with respect to the first scan line.

15. A method for operating a distance measuring unit,
the distance measuring unit, comprising:
an emitter unit which is configured for an emission of electromagnetic pulses, and specifically sequentially into different emitter solid angle segments of the detection field, a receiver unit having a first sensitive sensor face for detecting electromagnetic radiation, i.e. for receiving echo pulses after a distance-dependent time of flight, and imaging optics which image the detection field onto the first sensitive sensor face, and specifically each of the emitter solid angle segments onto a respective region of the first sensitive sensor face, wherein the emitter solid angle segments follow one another along a scan axis, and correspondingly the regions of the first sensitive sensor face also follow one another along a first scan line, wherein the first sensitive sensor face is subdivided into at least two pixels which adjoin one another on a first separating line, wherein the first separating line extends at least in sections obliquely with respect to the first scan line, the method comprising:
evaluating signal components, which are detected by the at least two pixels.

* * * * *